(12) United States Patent
Johnson et al.

(10) Patent No.: US 8,574,731 B2
(45) Date of Patent: Nov. 5, 2013

(54) DEVICE AND METHOD FOR AUGMENTING THE USEFUL LIFE OF AN ENERGY STORAGE DEVICE

(75) Inventors: Robert M. Johnson, Lake Zurich, IL (US); Jason N. Howard, Alpharetta, GA (US)

(73) Assignee: Motorola Mobility LLC, Libertyville, IL (US)

( * ) Notice: Subject to any disclaimer, the term of this patent is extended or adjusted under 35 U.S.C. 154(b) by 1194 days.

(21) Appl. No.: 12/260,614

(22) Filed: Oct. 29, 2008

(65) Prior Publication Data

US 2010/0104896 A1    Apr. 29, 2010

(51) Int. Cl.
*H01M 8/04* (2006.01)

(52) U.S. Cl.
USPC ................................ 429/9; 429/428; 320/101

(58) Field of Classification Search
USPC ....................... 429/428, 9; 320/101
See application file for complete search history.

(56) References Cited

U.S. PATENT DOCUMENTS

| 5,939,218 | A | 8/1999 | Mizuno |
| 6,635,374 | B1* | 10/2003 | Aramaki ...................... 429/413 |
| 7,172,826 | B2 | 2/2007 | Nomoto |
| 2002/0009623 | A1 | 1/2002 | St-Pierre et al. |
| 2007/0111047 | A1* | 5/2007 | Nomoto ......................... 429/13 |
| 2010/0013647 | A1* | 1/2010 | Morris et al. ................. 340/628 |

* cited by examiner

*Primary Examiner* — Ula C Ruddock
*Assistant Examiner* — Frank Chernow
(74) *Attorney, Agent, or Firm* — Gary J. Cunningham

(57) ABSTRACT

A method (300) and device (400) for augmenting the useful life of an energy storage device in a portable electronic device is disclosed. The method (300) can include the steps of: providing (315) a power module comprising a fuel cell and a battery; determining (310) relative humidity; and controlling (315) the operations of the power module in response to the determined relative humidity. Advantageously, the method (300) and device (400) can augment and prolong the useful life of an energy storage device in a portable electronic device, with minimal power drain.

10 Claims, 4 Drawing Sheets

DEVICE AND METHOD FOR AUGMENTING THE USEFUL LIFE OF AN ENERGY STORAGE DEVICE

BACKGROUND

1. Field

The present disclosure is directed to a device and method for augmenting the useful life of an energy storage device, and in particular, in connection with the use of portable electronic devices.

2. Introduction

Portable electronic devices have been gaining in popularity for years. For example, wireless communication and computing devices (herein referred to individually and collectively as wireless communication devices), have practically become a necessity in many countries.

As is known, portable electronic devices operate with a limited energy storage device, such as a battery, fuel cell or the like. While the energy storage device is generally rechargeable, it may not always be convenient or even possible for a user to recharge the device. Accordingly, there is a need to maximize the useful time of device operation. Thus, there is also a need to conserve energy or prolong useful energy storage device life.

Fuel cells can offer high energy density mobile power. The basic principle of operation is electrochemically reacting fuel with an oxidant (usually air) to produce electricity. Numerous types of fuel cells have been proposed with various fuels, such as methanol, ethanol, hydrogen, formic acid, chemical hydrides, methane, butane and other hydrocarbons. Depending on the fuel type, a fuel cell may produce a number of reaction by-products. However, in nearly every case, a major reaction by-product is water. Managing the water by-product can be a challenge in a portable electronic device to prevent undesirable condensation of the water in or near the device.

In connection with the use of fuel cells in portable electronic devices, there is a need to manage output gas relative humidity, and thus condensation, in a manner that attempts to maximize the operation of the portable device and energy storage useful life therein. Many portable electronic devices have used power draining air blowers, in an attempt to manage unwanted condensation in connection with fuel cells, however air blowers draw a lot of power, thus shortening the useful life of the energy storage device or fuel cell. Thus, alternatives to the use of power draining air blowers would be considered an improvement, to manage the condensation problem. It would be considered an improvement to be able to manage condensation in connection with the use of fuel cells while minimizing power drain.

There is a need for energy storage devices, including for example a battery and fuel cell in portable electronic devices, that allow continued operation, such as continuous power during conditions in which undesirable condensation occurs, and minimizes power drain.

Thus, there is a need for a method and device for prolonging the useful life of an energy storage device in connection with portable electronic devices.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
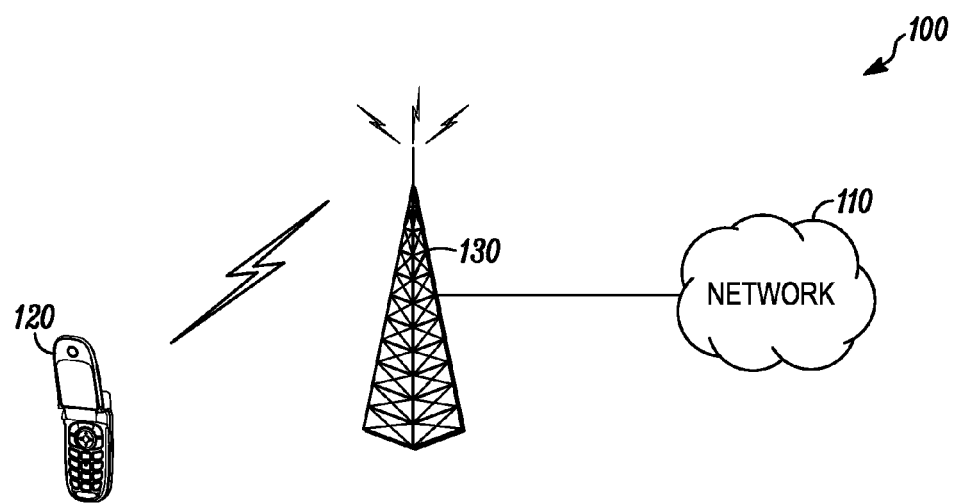
FIG. 1 is an exemplary block diagram of a communication system according to one embodiment.

FIG. 1 is an exemplary block diagram of a system 100 according to one embodiment. The system 100 can include a network 110, a terminal 120, and a base station 130. The terminal 120 may be a wireless communication device, such as a wireless telephone, a cellular telephone, a personal digital assistant, a pager, a personal computer, a selective call receiver, or any other device that is capable of sending and receiving communication signals on a network including wireless network. The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, a Third Generation (3G) network, a satellite communications network, and other like communications systems. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals. In operation, the terminal 120 can communicate with the network 110 and with other devices on the network 110 by sending and receiving wireless signals via the base station 130.

Figure 2:
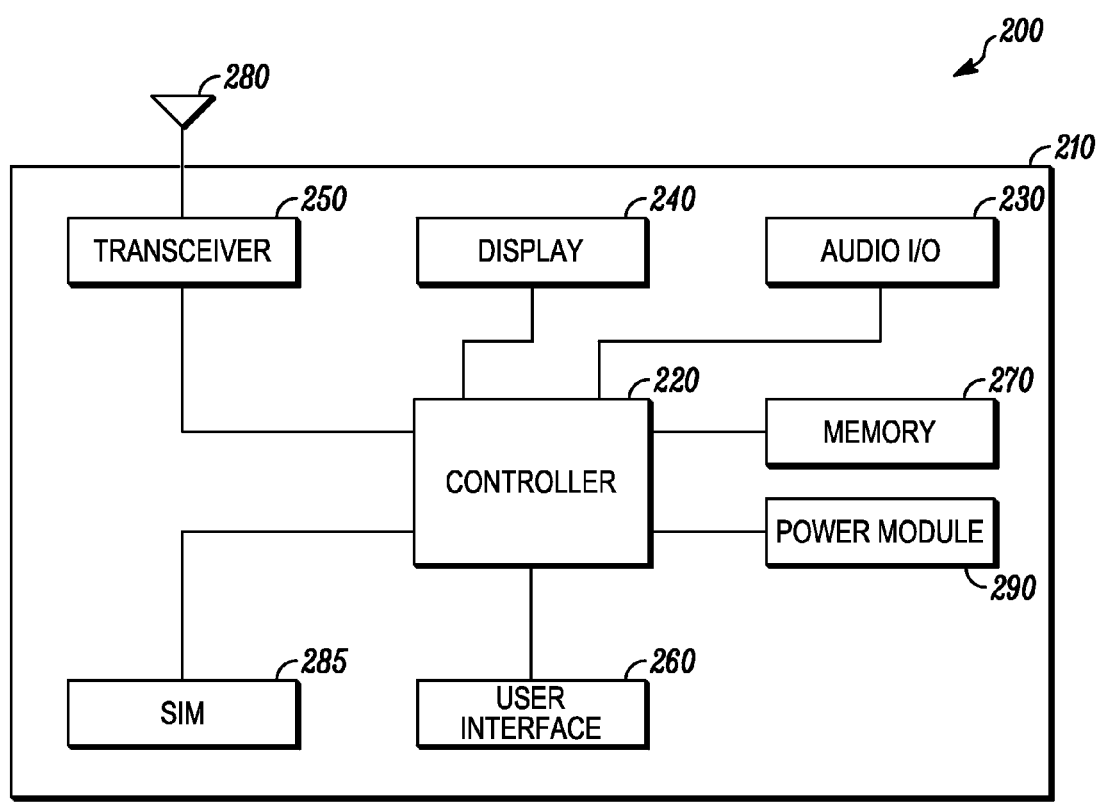
FIG. 2 is an exemplary block diagram of a portable electronic device, in the form of a wireless communication device, according to one embodiment.

FIG. 2 is an exemplary block diagram of a wireless communication and/or computing device 200, such as the terminal 120, according to one embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, an antenna 280 coupled to the housing 210 and the transceiver 250, and a removable subscriber module (SIM) 285 coupled to the controller 220. The wireless communication device 200 can include wireless communication device 200 also includes a power saving module 290 coupled to the controller 220. The power module 290 can reside within the controller 220, can reside within the memory 270, can be autonomous modules, can be software, can be hardware, or can be in any other format useful for a module on a wireless communication device 200.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory or any other memory that can be coupled to a wireless communication device.

Figure 3:
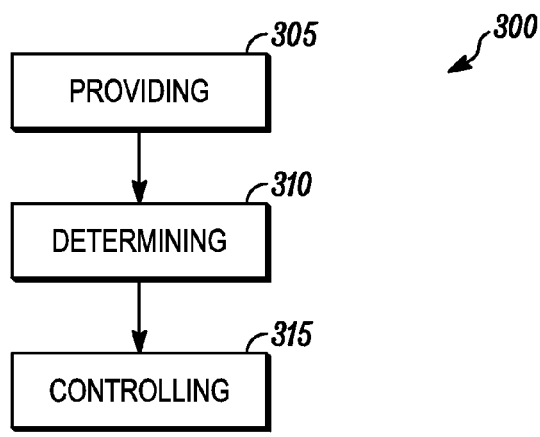
FIG. 3 is an exemplary flowchart illustrating the operation of a method for augmenting the useful life of an energy storage device according to one embodiment.

In FIG. 3, a method 300 for augmenting the useful life of an energy storage device in a portable electronic device is shown. The method 300 can include: providing 305 a power module comprising a fuel cell and a battery; determining 310 relative humidity; and controlling 315 the operations of the power module in response to the determined relative humidity. Advantageously, the method can augment and prolong the useful life of an energy storage device(s) in a portable electronic device, with minimal power drain, as detailed herein.

In one embodiment, the controlling step 315 can include switching between the fuel cell and battery for powering a load. In more detail, this can be accomplished, by: providing power substantially from the fuel cell when the determined relative humidity is below a threshold relative humidity; and providing power substantially from the battery when the determined relative humidity is at least at a threshold relative humidity. This feature can help to better utilize the battery and fuel cell, to maximize the useful life of an energy storage device. Advantageously, this "hybrid power system" is configured such that power can come from one of a plurality of energy storage devices or shared simultaneously, depending on which is more capable of meeting the load.

In a preferred embodiment, the controlling step 315 can include providing power substantially from the fuel cell when the determined relative humidity is below a threshold relative humidity and providing power substantially from the battery when the determined relative humidity is at least at or above a threshold relative humidity, which can contribute to prolonging and augmenting the useful life of an energy storage device.

In addition, in one arrangement, when the determined relative humidity is at or above a threshold relative humidity, it may not be able to deliver enough power to operate the electronic device. In this situation, the controlling step 315 includes charging the battery with the fuel cell and powering the electronic device by the battery. This arrangement can prolong the battery life.

In a preferred embodiment, the controlling step 315 can augment the useful life of the power module, by: providing power to a load with the fuel cell when the determined relative humidity is below a threshold relative humidity; and providing power to a load with the battery when the determined relative humidity is at least a threshold relative humidity, while at least periodically recharging the battery with the fuel cell and maintaining a desired charge in the battery.

Figure 4:
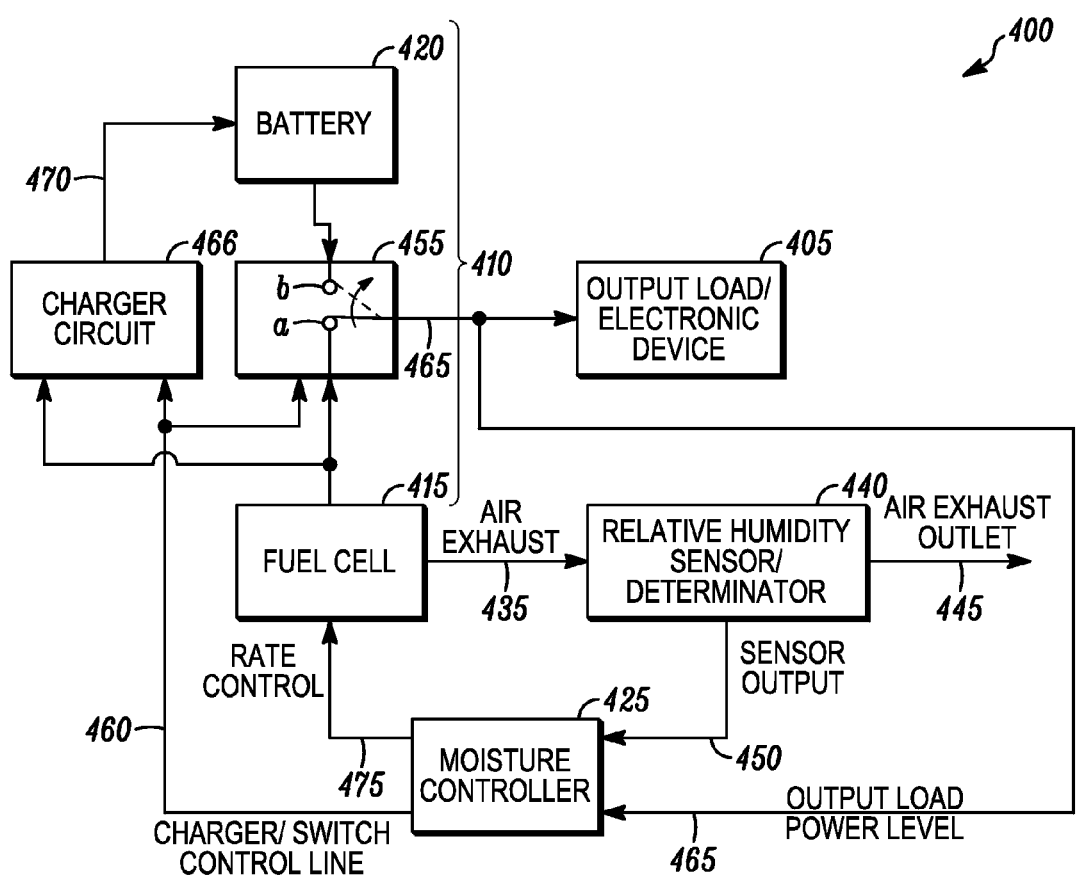
FIG. 4 is an exemplary block diagram of a portable electronic device for augmenting the useful life of an energy storage device according to one embodiment.

Turning to the determining step 310, it can include at least one of: sensing the relative humidity in proximity of the fuel cell, as shown in FIG. 4; and estimating the relative humidity in proximity of the fuel cell.

In more detail, the estimation can be based on an algorithm of fuel cell usage. For example, since power generation is a function of fuel consumption rate, and water generation is a function of fuel consumption, relative humidity of the fuel cell exhaust in a given device can be estimated from easily measured parameters including power output and temperature. Advantageously, in this instance, a sensor and feedback would not be necessary, thus a simpler circuit could be utilized.

Advantageously, the method 300 can be thought of as being passive, and thus draws less power than using a blower. Accordingly, the method 300 can be free from using a blower to adjust relative humidity in proximity to the fuel cell, in one embodiment.

Also in a preferred embodiment, the method is used in an electronic device, such as a wireless communication device, for improved energy storage useful life and talk time and minimal background noise during a voice call.

In more detail, returning in FIG. 2, an electronic device, such as a wireless communication device 200 is shown. It can include a two way radio, a mobile telephone and the like, and include: a housing 210; a controller 220 coupled to the housing 210, the controller 220 configured to control the operations of the wireless communication device; memory 270 coupled to the controller 220; memory 270 coupled to the controller 220; a transceiver 250 coupled to the controller 220; and a power module 290. Advantageously, an electronic device, such as a wireless communication device can provide longer energy storage, or enhanced battery and fuel cell life, and an improved user experience.

In FIG. 4, a device 400 for augmenting the useful life of an energy storage device in a portable electronic device, is shown. It can include: an electronic device 405; an energy storage device 410 comprising a fuel cell 415 and a battery 420; and a controller 425 coupled to the electronic device 405, the controller 425 is configured to determine relative humidity and control the operations of the power module 430, in response to the determined relative humidity. Advantageously, the device 400 can be used to maximize the useful life of the energy storage device 410, and constituent components, such as the fuel cell 415 and battery 420.

The augmenting device 400 relates to managing humidity and undesirable condensation created as an output from the fuel cell 415, when used in a portable electronic device, such as a cell phone. As is known, a fuel cell has water or moisture in its exhaust stream. The device 400 can be thought of as being passive and provides an alternative to using a power draining air blower or other means to remove excess humidity. Disadvantageously, air blowers can provide unwanted noise, when the electronic device 405 is a cell phone or other audio device.

In the embodiment shown in FIG. 4, a fuel cell's air exhaust line 435 is coupled to a relative humidity sensor/determinator 440, which in turn is coupled to an air exhaust outlet line 445. A sensor output at line 450, level can be compared with a relative humidity threshold or limit. If at or above the threshold, then the fuel cell's output can be disconnected from the electronic device via a switch 455, through a signal through a control line 460. The switch 455 is operable to provide a source of power from the fuel cell 415, as shown in position a, or the other power source, such as a battery 420, as shown in position b. As should be understood, the other power source could be a battery, a power supply such as a wall power supply, a battery charger, a cellular phone battery charger, etc.

In one embodiment, the sensor/determinator 440 can be a temperature sensor, a humidity sensor and another element, such as software operating in a microprocessor, to calculate the relative humidity.

The controller 425 can include a comparator, and can be a hardware component or a software element operating in a microprocessor with a control port driven to enable or disable the fuel cell 415 and/or to move the switch 455, to source power through line 465 to the output load/electronic device 405. The charger/switch control line 460 can be utilized to control the charger circuit 466 and switch 455, as detailed below.

Another important aspect of the device 400 relates to maintaining a desired level of charge to the battery 420, through a charger circuit 466 connected between the fuel cell 415 and the battery 420.

During use, the amount of moisture created at the output of the fuel cell at line 435 can be estimated given the amount of power being delivered to the output load/electronic device 405. Given the measured relative humidity level, only a certain amount of moisture may be added before condensation is produced in the air exhaust at line 445. Thus, the total amount of energy created by the fuel cell 415 can be determined. This amount of energy may be less than the output load needs or requires to operate. In this example, the fuel cell output power can be added to the Battery output power to meet the total needs of the electronic device 405.

This adding of power can occur by way of the fuel cell 415 charging the battery 420 and the battery 420 powering the output load/electronic device 405. The charge rate can be set to minimize undesirable condensation from occurring.

In more detail, the charger circuit 466 can include a dual input regulator with control being managed via control line 460, to substantially maintain the power drawn from the fuel cell below a threshold level whereby undesirable condensation will occur. Advantageously, the charger circuit helps to maximize the useful life of the energy storage device 410 and component parts.

In FIG. 4, the controller 425 is coupled to a switch 455 configured to allow at least one of the fuel cell and battery, to power a load/device 405. In more detail, controller 425 can be configured to provide power to a load/device 405 from the fuel cell 415 in the event the determined relative humidity at 440, is below a threshold relative humidity and from the battery 420 in the event the determined relative humidity is at least at or above the threshold relative humidity.

The controller 425 can also be configured to provide at least a periodic charge for charging the battery 420 via line 470, with the fuel cell 415. This arrangement can enhance the useful battery life in device 400. In a preferred embodiment, controller 425 configured to provide at least a periodic charge with the fuel cell 415, for charging the battery 420, when the determined relative humidity is at least at a threshold relative humidity. This arrangement can help prolong and maximize the useful life of the energy storage device 410 in FIG. 4.

In a preferred embodiment, and in more detail in FIG. 4, the controller 425 can be configured to help maximize the useful life of the energy storage device 410, by: providing power to a load via line 465 with the fuel cell 415 when the determined relative humidity is below a threshold relative humidity; providing power to a load via line 465 with the battery 420 when the determined relative humidity is at least at or above a threshold relative humidity; periodically charging the battery 420 with the fuel cell 415 via the charger 466 and output line 470, to maintain a desired charge in the battery 420.

The augmenting device 400 in FIG. 4, can include a sensor/determinator 440 for sensing the relative humidity in proximity of the fuel cell when used as a sensor, in one embodiment, and as a determinator or estimator for estimating the relative humidity, in a second embodiment, in proximity to the fuel cell 415.

In a preferred embodiment, the augmenting method 300 and device 400, shown in FIGS. 3 and 4, are particularly adapted for use in connection with portable electronic devices, and are especially adapted to use in wireless communication device applications, for maximizing operational time or talk-time with minimal power drain in removing undesirable condensation due to a fuel cell.

Figure 5:
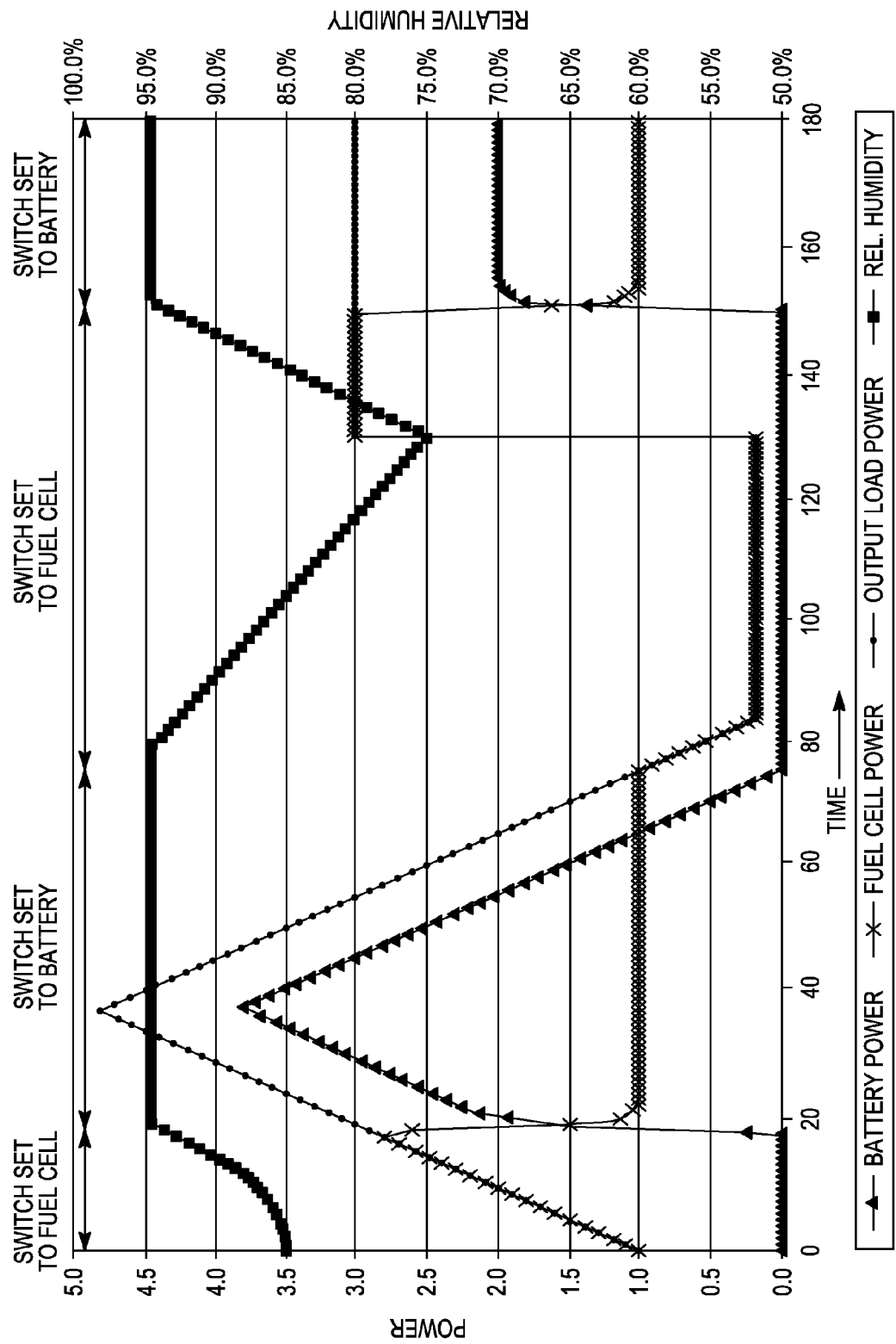
FIG. 5 is an exemplary graph illustrating the operation of a portable electronic device for augmenting the useful life of an energy storage device according to one embodiment.

FIG. 5 illustrates one example of the operation of this invention. (The values are arbitrary and for illustration only.) As the load varies, fuel cell and battery output are managed to provide the most efficient energy delivery (in this case, maximum output from the fuel cell) without exceeding the relative humidity limit of the fuel cell exhaust. When the relative humidity limit or threshold is approached, fuel cell output is reduced, and battery output is increased. This example of operation is summarized by describing several steps shown in FIG. 5:

1. Time approximately 0
The output load is operating at a nominal power. The full output load is provided by the fuel cell.
2. Time approximately 10
Load power is shown increasing. The fuel cell increases power output to match the load.
3. Time approximately 20
Load power continues to increase. Relative humidity reaches a threshold limit. The fuel cell power output is reduced to keep relative humidity below the threshold. Battery power is engaged or switched on to provide the desired output load power.
4. Time approximately 30
The output load is shown as still increasing. Battery power continues to increase to meet output load power. Relative humidity is stable. The fuel cell power is stable.
5. Time approximately 40
The desired load power reaches a maximum and begins decreasing. Battery power maximum is reached and begins to decrease. Relative humidity is stable. The fuel cell power is stable
6. Time approximately 80
Load power continues to drop. Relative Humidity begins to decline. The fuel cell begins to reduce output power. Battery power output drops to zero. Alternatively, during this time, excess available fuel cell power is available that can be used to recharge the battery, as shown in FIG. 4 line 470.
7. Time approximately 130
Load power steps up. The fuel cell output power steps up. Relative humidity begins to rise.
8. Time approximately 150
Load power remains constant. Relative humidity again reaches a threshold or critical limit. Fuel cell power is reduced to maintain relative humidity below a threshold limit. Battery power is increased to make up for fuel cell decreased output.

Figure 6:
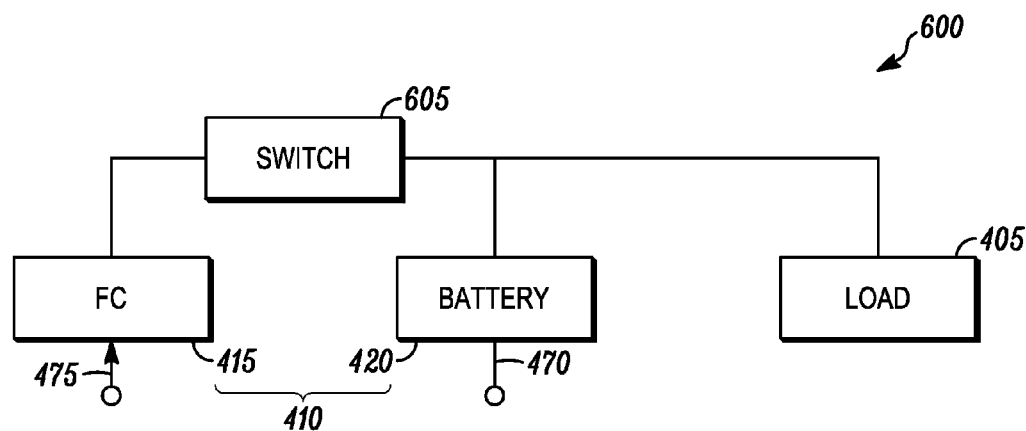
FIG. 6 is an alternative, partial exemplary block diagram of the portable electronic device for augmenting the useful life of an energy storage device shown in FIG. 4, according to one embodiment.

FIG. 6 is an alternative, partial exemplary block diagram of the portable electronic device for augmenting the useful life of an energy storage device shown in FIG. 4, according to one embodiment. The augmenting device 600 in FIG. 6, can include a fuel cell 415, battery 420 and toggle switch 605. In operation, when the switch 605 is in a closed position, both the fuel cell 415 and battery 420 can provide power to the load 405. The battery can be charged through line 470. Alternatively, when the switch 605 is open, only the battery 420 provides power to the load 405.

Figure 7:
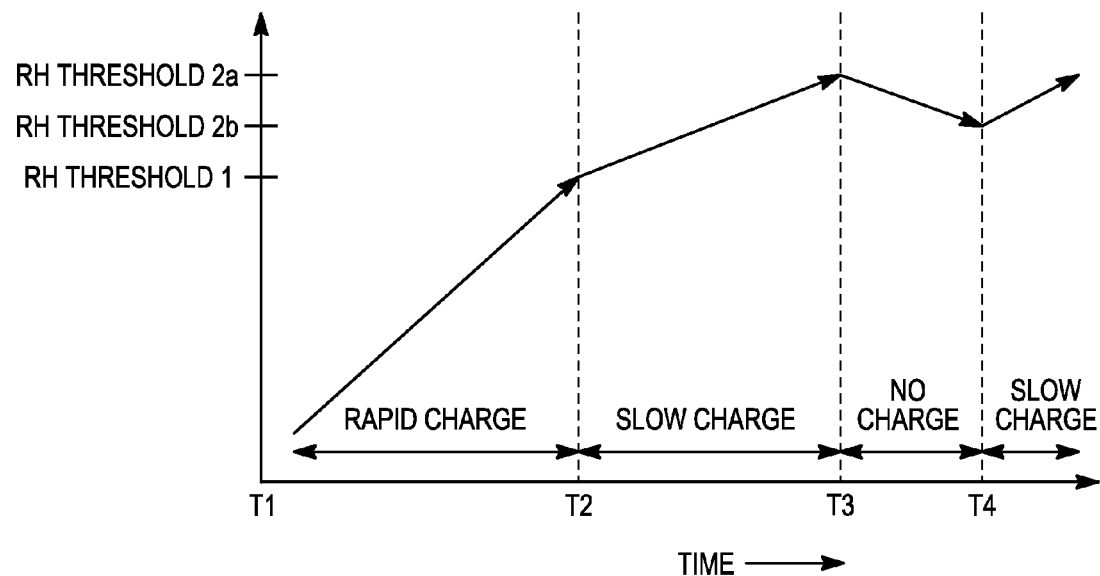
FIG. 7 is an exemplary graph illustrating the operation of a portable electronic device for augmenting the useful life of an energy storage device, having relative humidity on a vertical axis and time on a horizontal axis, according to one embodiment.

FIG. 7 is an exemplary graph illustrating the operation of a portable electronic device for augmenting the useful life of an energy storage device, showing relative humidity on a vertical axis and time on a horizontal axis, according to one embodiment. FIG. 7, relates to controlling the rate at which a charging circuit, such as 460 in FIG. 4, pulls power from the fuel cell. As should be understood by those skilled in the art, the line 460 and others shown in FIG. 4, can be multiple conductor lines.

The graph in FIG. 7 illustrates a rapid charge, slow charge, no charge and slow charge, at various times along the horizontal axis. For example, at T1 or when the relative humidity is below RH threshold 1, the charge rate can be set to rapid. At T2 or when the relative humidity increases above RH threshold 1, the charge rate can be reduced to a slow charge. At T3 or when the relative humidity increases above RH threshold 2a, the charger can be disabled. And, at T4 or when the RH drops down to RH threshold 2b, the charger is again set to slow charge. This graph is exemplary and shows how such a system can be operated in one embodiment.

The method (300) and device (400) can vary, and can preferably be implemented in a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method in a portable electronic device, comprising:
providing a wireless communication device including a power module comprising a fuel cell and a battery;
determining relative humidity of an air exhaust line of the fuel cell; and
controlling the operations of the power module in response to the determined relative humidity, by: passively adjusting relative humidity of the air exhaust line of the fuel cell by being free from using a blower; providing power to a load with the fuel cell when the determined relative humidity is below a threshold relative humidity; and providing power to a load with the battery when the determined relative humidity is at least at a threshold relative humidity.

2. The method of claim 1, wherein the controlling step includes switching between the fuel cell and battery for powering a load.

3. The method of claim 1, wherein the controlling step includes providing power from the fuel cell when the determined relative humidity is below a threshold relative humidity.

4. The method of claim 1, wherein the controlling step includes providing power from the battery when the determined relative humidity is at least at a threshold relative humidity.

5. The method of claim 1, wherein the controlling step includes switching between the fuel cell and battery for powering a load, by:
providing power from the fuel cell when the determined relative humidity is below a threshold relative humidity;
providing power from the battery when the determined relative humidity is at least at a threshold relative humidity.

6. The method of claim 1, wherein the controlling step includes charging the battery when the determined relative humidity is at least at a threshold relative humidity, with the fuel cell.

7. The method of claim 1, wherein the controlling step includes augmenting the useful life of the power module, by:
providing power to a load with the fuel cell when the determined relative humidity is below a threshold relative humidity;
providing power to a load with the battery when the determined relative humidity is at least at a threshold relative humidity.

8. The method of claim 1, wherein the controlling step includes augmenting the useful life of the power module, by: periodically charging the battery with the fuel cell.

9. The method of claim 1, wherein the determining step includes at least one of:
sensing the relative humidity of the air exhaust line of the fuel cell; and estimating the relative humidity of the air exhaust line of the fuel cell.

10. A method in a portable electronic device, comprising:
providing a portable electronic device including a power module comprising a fuel cell and a battery;
determining relative humidity of an air exhaust line of the fuel cell, the determining step including at least one of: sensing the relative humidity and estimating the relative humidity; and
controlling the operations of the power module in response to the determined relative humidity, by: passively adjusting relative humidity of the air exhaust line of the fuel cell; providing power to a load with the fuel cell when the determined relative humidity is below a threshold relative humidity; and providing power to a load with the battery when the determined relative humidity is at least at a threshold relative humidity.

* * * * *